(12) United States Patent
Kurose et al.

(10) Patent No.: US 8,660,618 B2
(45) Date of Patent: Feb. 25, 2014

(54) WIRELESS COMMUNICATION APPARATUS

(75) Inventors: Kengo Kurose, Tokyo (JP); Toshiya Takano, Tokyo (JP); Takashi Minemura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 123 days.

(21) Appl. No.: 13/166,727

(22) Filed: Jun. 22, 2011

(65) Prior Publication Data

US 2012/0003949 A1    Jan. 5, 2012

(30) Foreign Application Priority Data

Jun. 30, 2010   (JP) .................................. 2010150031

(51) Int. Cl.
*H04B 1/38* (2006.01)
*H04B 1/16* (2006.01)

(52) U.S. Cl.
USPC ..................... 455/574; 455/226.2; 455/343.1; 370/311

(58) Field of Classification Search
USPC ........ 455/226.1, 226.2, 229, 572, 574, 343.1, 455/343.2, 436; 370/311, 328, 331, 332
See application file for complete search history.

(56) References Cited

U.S. PATENT DOCUMENTS

| | | | | |
|---|---|---|---|---|
| 5,254,897 | A * | 10/1993 | Miller et al. | 340/13.2 |
| 6,236,674 | B1 * | 5/2001 | Morelli et al. | 455/574 |
| 6,445,262 | B1 * | 9/2002 | Tanaka et al. | 455/552.1 |
| 7,224,751 | B2 * | 5/2007 | Fulli et al. | 375/324 |
| 7,606,329 | B2 | 10/2009 | Yamauchi | |
| 7,865,922 | B2 * | 1/2011 | Unger | 725/50 |
| 7,904,121 | B2 | 3/2011 | Umeda et al. | |

FOREIGN PATENT DOCUMENTS

| | | |
|---|---|---|
| JP | 10-23519 | 1/1998 |
| JP | 2005-229570 | 8/2005 |
| JP | 2007-104174 | 4/2007 |
| JP | 2009-89434 | 4/2009 |
| JP | 2009-089434 | 4/2009 |

OTHER PUBLICATIONS

JP office action for application 2010-150031 mailed on Sep. 13, 2011.
JP office action for application 2010-150031 mailed on Dec. 6, 2011.

* cited by examiner

*Primary Examiner* — Quochien B Vuong
(74) *Attorney, Agent, or Firm* — Knobbe, Martens, Olson & Bear LLP

(57) ABSTRACT

According to one embodiment, a wireless communication apparatus includes a filter module, a generator, a first comparator and a power management module. The filter module is configured to transmit an uplink channel component among a received signal by an antenna. The generator is configured to generate an input voltage by using the uplink channel component. The first comparator is configured to output a first high signal when the input voltage is higher than a first threshold voltage, and output a first low signal when the input voltage is not higher than the first threshold voltage. The power supply management module is configured to change a power supply for transmission and reception of a wireless signal from an off state to an on state when the first high signal is continuously output for a minimum transmission time of an uplink signal or more.

6 Claims, 5 Drawing Sheets

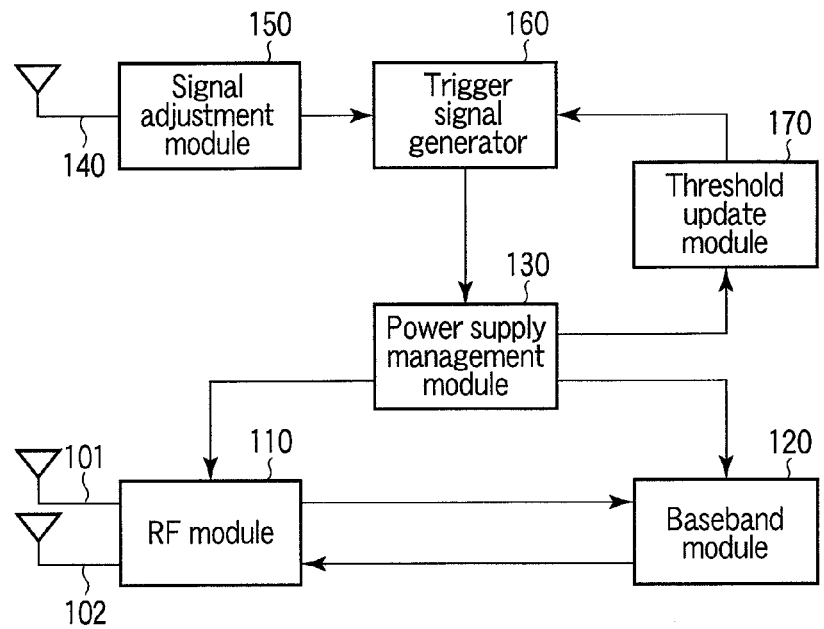
F I G. 1
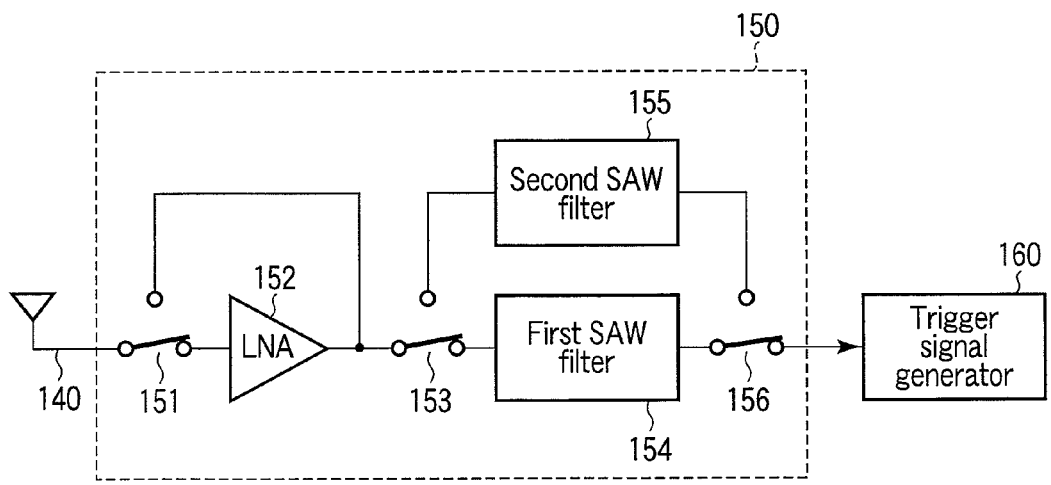
F I G. 2

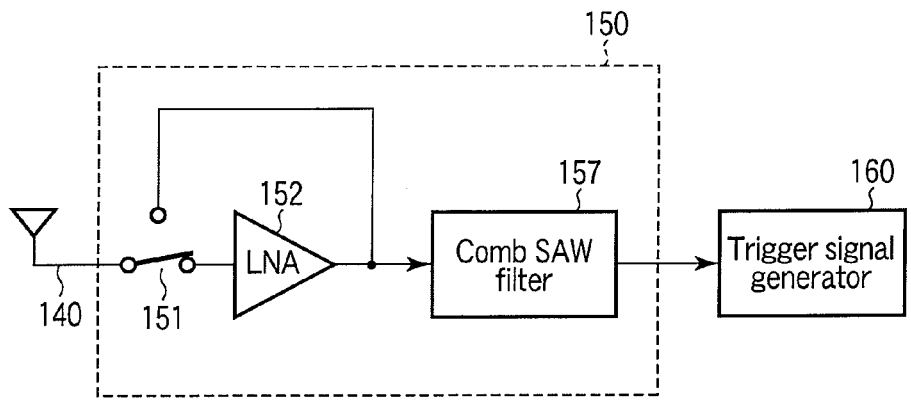
F I G. 3
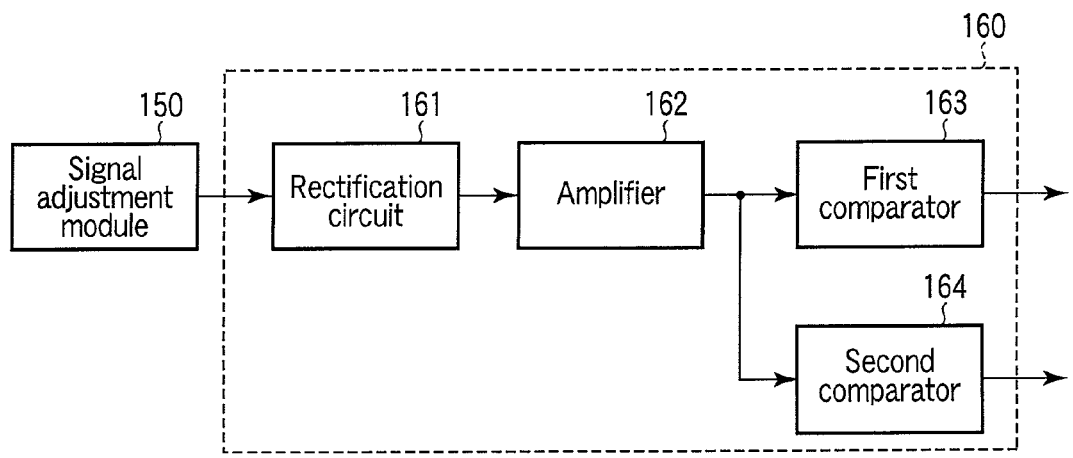
F I G. 4
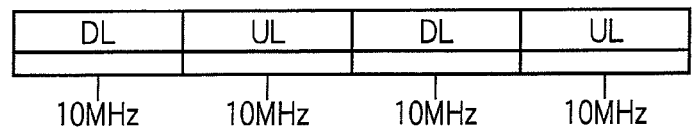
F I G. 5

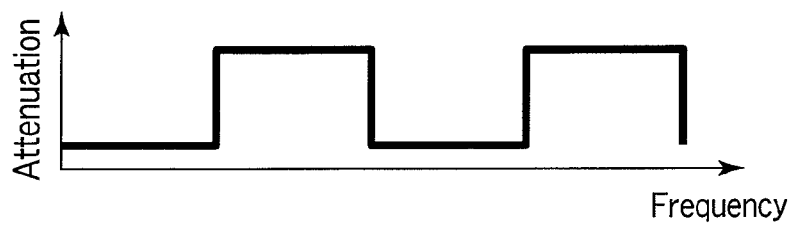
F I G. 6
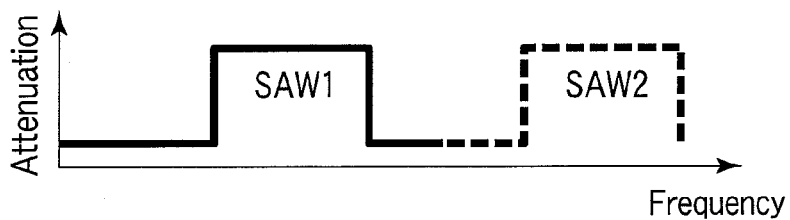
F I G. 7
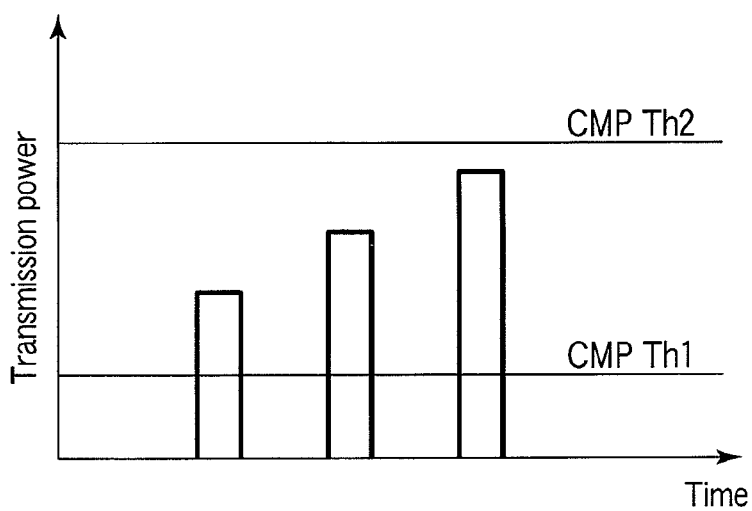
F I G. 8

WIRELESS COMMUNICATION APPARATUS

CROSS-REFERENCE TO RELATED APPLICATIONS

This application is based upon and claims the benefit of priority from Japanese Patent Application No. 2010-150031, filed Jun. 30, 2010; the entire contents of which are incorporated herein by reference.

FIELD

Embodiments described herein relate generally to power supply management of a wireless communication apparatus.

BACKGROUND

Heretofore, a number of base stations have been installed as infrastructure for wireless communications (such as cellular communications). These base stations typically provide a relatively wide communication area which is called a macrocell. Because of the characteristics of radio waves, communication quality easily deteriorates locally even in a macrocell, such as an area around a boundary between the macrocell and the adjacent macrocell, indoors, and basements. To assist the base stations (hereinafter referred to as a "macrocell base station" for convenience) in such circumstances in which the communication quality easily deteriorates, small base stations have been installed to provide a relatively narrow communication area which is called a nanocell or a picocell. In addition, for example, in the High-Speed Packet Access (HSPA) system which is a 3.5 G system, femtocell base stations have been used to provide a further narrower communication area (for example, an area to cover a building), which is called a femtocell. Generally, femtocell base stations are installed in buildings which are located in macrocells of macrocell base stations.

In the cellular communication system of the 3.5 G system and later systems, the transmission speed is determined in accordance with the reception quality, based on an adaptive modulation technique. Introduction of femtocell base stations is effective for significant improvement of the transmission speed of a wireless terminal (such as a cellular phone). In addition, when high-speed cellular communication can be easily performed by introduction of femtocell base stations, significance of supporting another wireless communication system such as a wireless LAN in addition to the cellular communication, such as in a dual terminal, is reduced. In the case of supporting no other wireless communication systems, the size, cost, and power consumption in a wireless terminal can be properly reduced.

In the meantime, a femtocell is typically installed in the user's house through a contract between the user and a communication provider, and limits radio terminals, for which connection is allowed, (to, for example, wireless terminals of the contracted user) by user authentication. In consideration of such a form of use, it is estimated that the time period during which a femtocell base station is required to operate is limited. It is effective for reduction in power consumption to turn off the power supply for transmission/reception of wireless signals in a time period during which the femtocell base station is not required to operate.

As a method of managing the power supply of the femtocell base station, there is a method of always maintaining a power supply for reception in the on state, and changing the power supply for transmission from the off state to the on state when a wireless terminal of the user starts communication. Specifically, start of communication is detected by constantly monitoring a random access channel (uplink) which is used for frequency resource request. Constant monitoring of the random access channel can be realized by selecting a proper reception filter by a switch.

The above method consumes, however, electric power for reception also in most time periods during which the user does not use the femtocell base station. In particular, in the case where an interference avoiding technique called fractional frequency re-use (FFR) is used, it may be necessary to monitor a plurality of different bands for the random access channel, dependent on the regulations (the specification of the provider) of FFR. In such a case, the method incurs larger power consumption for reception, and the effect of reduction in power consumption achieved by the above method is reduced.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram illustrating a wireless communication apparatus according to a first embodiment.

FIG. 2 is a block diagram illustrating an example of a signal adjustment module of FIG. 1.

FIG. 3 is a block diagram illustrating another example of the signal adjustment module of FIG. 1.

FIG. 4 is a block diagram illustrating a trigger signal generator of FIG. 1.

FIG. 5 is a diagram illustrating frequency allocation of UL and DL when FFR is used.

FIG. 6 is a diagram illustrating an attenuation characteristic of a comb SAW filter of FIG. 3.

FIG. 7 is a diagram illustrating attenuation characteristics of a first SAW filter and a second SAW filter of FIG. 2.

FIG. 8 is an explanatory diagram of transmission power in a random access channel and thresholds of a first comparator and a second comparator of FIG. 4.

DETAILED DESCRIPTION

Figure 9:
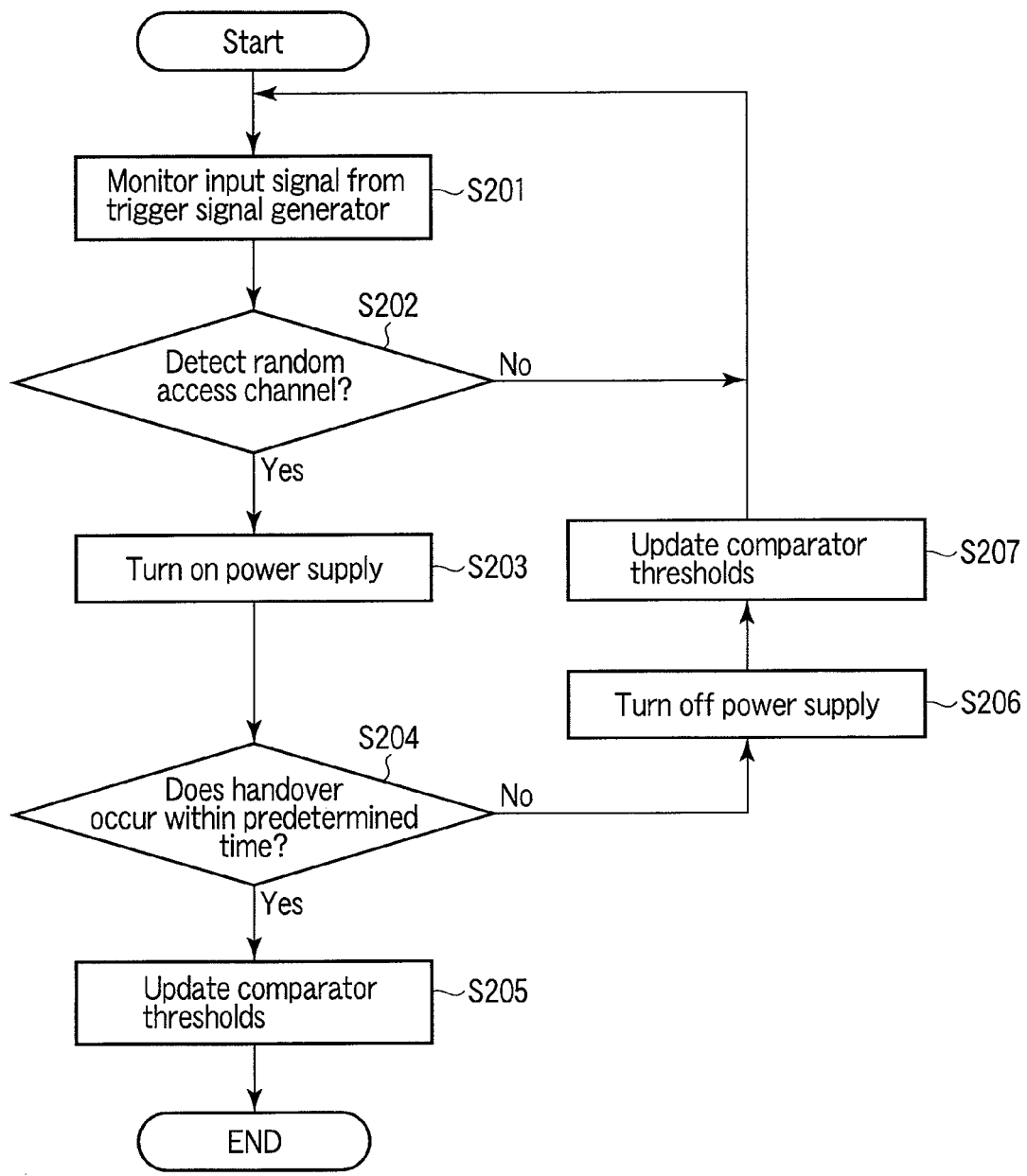
FIG. 9 is a flowchart illustrating power supply management processing according to the first embodiment.

Various embodiments will be described hereinafter with reference to the accompanying drawings.

In general, according to one embodiment, a wireless communication apparatus includes a filter module, a generator, a first comparator and a power management module. The filter module is configured to transmit an uplink channel component among a received signal by an antenna. The generator is configured to generate an input voltage by using the uplink channel component. The first comparator is configured to output a first high signal when the input voltage is higher than a first threshold voltage, and output a first low signal when the input voltage is not higher than the first threshold voltage. The power supply management module is configured to change a power supply for transmission and reception of a wireless signal from an off state to an on state when the first high signal is continuously output for a minimum transmission time of an uplink signal or more.

First Embodiment

As illustrated in FIG. 1, a wireless communication apparatus according to a first embodiment comprises antennas 101 and 102, a radio-frequency (RF) module 110, a baseband module 120, a power supply management module 130, an antenna 140, a signal adjustment module 150, a trigger signal generator 160, and a threshold update module 170. The wireless communication apparatus of FIG. 1 is, for example, a femtocell base station, but not limited to it. The wireless communication apparatus of FIG. 1 may be realized by a mobile terminal or a PC.

The antennas 101 and 102, the RF module 110 and the baseband module 120 have identical or similar functions to those of elements in a conventional femtocell base station.

The antennas 101 and 102 radiate an RF transmission signal which is input from the RF module 110, and input an RF reception signal to the RF module 110. The number of antennas of the wireless communication apparatus of FIG. 1 is not limited to two.

The RF module 110 produces the RF transmission signal, by subjecting a baseband transmission signal from the baseband module 120 to up-conversion and adjustment (such as digital-to-analog conversion, filtering, and power amplification). The RF module 110 also produces a baseband reception signal, by subjecting the RE reception signal to down-conversion and adjustment (such as analog-to-digital conversion, filtering, and low-noise amplification).

The baseband module 120 performs baseband signal processing, based on the wireless signal form of the wireless communication system (such as cellular communication system) which is used by the wireless communication apparatus of FIG. 1. For example, the baseband module 120 produces the baseband transmission signal, by adding an error correction code to transmission data, subjecting the transmission data to interleaving, and modulating the transmission data. In addition, the baseband module 120 produces reception data, by demodulating the baseband reception signal from the RF module 110, and subjecting the baseband reception signal to de-interleaving and error correction.

The power supply management module 130 manages the power supply of the RF module 110 and the baseband module 120. Specifically, the power supply management module 130 can start/stop transmission and reception of wireless signals, by managing turning on/off of the power supply for transmission/reception of wireless signals. During the power supply for transmission/reception of wireless signals is turned off, power consumption by the RF module 110 and the baseband module 120 is ideally zero. Power supply management processing performed by the power supply management module 130 will be described later.

The antenna 140 receives radio waves, and inputs the waves to the signal adjustment module 150. The signal adjustment module 150 adjusts a signal from the antenna 140, and obtains a desired band component. The trigger signal generator 160 generates a trigger signal, by using the signal adjusted by the signal adjustment module 150. Based on the trigger signal, the power supply management module 130 detects that an uplink signal such as a random access signal is transmitted from a wireless terminal (such as a mobile terminal and a PC) of the user. The following is specific explanation of the signal adjustment module 150, the trigger signal generator 160, and the power supply management module 130.

As illustrated in FIG. 2, the signal adjustment module 150 includes, a low-noise amplifier (LNA) switch 151, an LNA 152, a filter switch 153, surface acoustic wave (SAW) filters 154 and 155, and a filter switch 156.

The LNA 152 has a function of amplifying a level of a signal from the antenna 140, and thereby adjusting a reception level in the trigger signal generator 160. The LNA switch 151 selects whether a signal from the antenna 140 is input to the LNA 152 or not. Usually, it is selected to input the signal to the LNA 152, when the reception level of an uplink signal transmitted from a wireless terminal of the user is low. When a femtocell base station is assumed to be the wireless communication apparatus of FIG. 1, the state of the LNA switch 151 is set manually or automatically when the femtocell base station is installed. As an example, in the case where the femtocell base station and the user's wireless terminal are frequently used on the same floor in the same building, the LNA switch 151 is set not to select input to the LNA 152. On the other hand, in the case where the femtocell base station and the user's wireless terminal are frequently used on different floors in the same building, the LNA switch 151 is set to select input to the LNA 152. It is possible to adopt the design of providing another LNA which has a different gain, and the design of making the gain of the LNA 152 variable.

The level of the signal from the antenna 140 is amplified by the LNA 152, if necessary, and thereafter the signal is input to at least one of the first SAW filter 154 and the second SAW filter 155 through the filter switch 153. The first SAW filter 154 and the second SAW filter 155 let a desired band component pass, and suppress unnecessary band components. Specifically, the first SAW filter 154 and the second SAW filter 155 function as band-pass filters (BPF). However, the first SAW filter 154 and the second SAW filter 155 have different passbands, as illustrated in FIG. 7. The signal which has passed through the first SAW filter 154 or the second SAW filter 155 is input to the trigger signal generator 160 through the filter switch 156. The filter switch 153 and the filter switch 156 operate together to let the signal pass through at least one of the first SAW filter 154 and the second SAW filter 155.

The term "desired band component" indicates a band which is monitored to determine whether the power supply for transmission/reception of wireless signals is changed from the off state to the on state (specifically, whether it is the activation timing of the wireless communication apparatus of FIG. 1 or not) by the power supply management module 130. For example, a random access channel, in which a random access signal is transmitted when communication is started, is suitable for the desired band. In addition, supposing that the wireless terminal of the user starts communication outside the building in which the wireless communication apparatus of FIG. 1 is installed and the user enters the building in a state where the communication is continued, an uplink channel other than the random access channel (such as a dedicated channel) may be dealt with as the desired band. According to the above design, the wireless communication apparatus of FIG. 1 is activated based on the uplink signal after the user enters the building, and the communication is handed over.

The following is explanation of the technical significance of using the first SAW filter 154 and the second SAW filter 155 which have different passbands. In an Orthogonal Frequency Division Multiplexing (OFDM) system such as Long Term Evolution (LTE), there is the problem that the throughput is reduced because of interference at the boundary of the cell. FFR is known as a technique for avoiding interference. For example, in a World Interoperability for Microwave Access (WiMAX) system, FFR is actually operated prior to the LTE system. When FFR is used, as illustrated in FIG. 5, it is necessary to monitor a plurality of different bands for the uplink channels (including the random access channel), dependent on the regulations (specification of the provider) of FFR. In FIG. 5, the reference symbol "UL" denotes an uplink channel, and the reference symbol "DL" denotes a downlink channel Therefore, there are cases where is necessary to combine a plurality of BPFs having different passbands to monitor uplink channels. In particular, SAW filters are known as having a sharp attenuation characteristic, and suitable for sufficiently suppressing unnecessary band components while sufficiently letting a desired band component pass. The SAW filters may be replaced by other BPFs as a matter of course.

In addition, as illustrated in FIG. 6, a SAW filter can have a plurality of passbands according to the design. A SAW filter which has a plurality of passbands is called comb SAW filter. As illustrated in FIG. 3, the filter switch 153, the first SAW filter 154, the second SAW filter 155, and the filter switch 156 in FIG. 2 may be replaced by a comb SAW filter 157 which has the attenuation characteristic illustrated in FIG. 6.

The trigger signal generator 160 preferably has a configuration which requires small standby power. For example, the trigger signal generator 160 includes a rectification circuit 161, an amplifier 162, a first comparator 163, and a second comparator 164, as illustrated in FIG. 4.

The rectification circuit 161 rectifies an output signal from the signal adjustment module 150. The output signal of the signal adjustment module 150 corresponds to an uplink reception signal (reception level of which is adjusted by the LNA 152, if necessary). Specifically, the rectification circuit 161 produces direct-current (DC) power by rectifying the uplink reception signal.

The amplifier 162 amplifies the power of the output signal from the rectification circuit 161, and inputs voltage to each of the first comparator 163 and the second comparator 164. For example, the amplifier 162 amplifies the output current from the rectification circuit 161, then converts the current to voltage, and inputs the voltage to each of the first comparator 163 and the second comparator 164.

The first comparator 163 compares the input voltage from the amplifier 162 with a first threshold voltage. When the input voltage is higher than the first threshold voltage, the first comparator 163 outputs a high signal. When the input voltage is not higher than the first threshold voltage, the first comparator 163 outputs a low signal. The second comparator 164 compares the input voltage from the amplifier 162 with a second threshold voltage. When the input voltage is higher than the second threshold voltage, the second comparator 164 outputs a high signal. When the input voltage is not higher than the second threshold voltage, the second comparator 164 outputs a low signal. The second threshold voltage is higher than the first threshold voltage. Each of the output signals of the first comparator 163 and the second comparator 164 is supplied to the power supply management module 130.

The following is explanation of a technical significance of the first comparator 163 and the second comparator 164. As described above, the input voltage to the first comparator 163 and the second comparator 164 is produced by using the reception power in the uplink channel. Therefore, supposing that the transmission power of the wireless terminal is fixed, the input voltage increases as the loss occurring between the wireless terminal and the wireless communication apparatus of FIG. 1 decreases, and the input voltage decreases as the loss increases. Supposing that the wireless communication apparatus of FIG. 1 is a femtocell base station which is installed, for example, in a building, it can be considered that the intensity of the reception power from the wireless terminal of the user in the building falls within a range of a certain degree.

Therefore, when the first threshold voltage is set based on the intensity of the input voltage which corresponds to the case where the reception power of the uplink signal from the user's wireless terminal is the lowest, and the second threshold voltage is set based on the intensity of the input voltage which corresponds to the case where the reception power is the highest, it can be easily determined whether the uplink signal from the user's wireless terminal is received or not. For example, when the first comparator 163 outputs a low signal or the second comparator 164 outputs a high signal, it can be determined that the uplink signal from the user's wireless terminal is not received. On the other hand, when the first comparator 163 continues to output a high signal and the second comparator 164 continues to output a low signal for the minimum transmission time of the uplink signal of the wireless terminal or more, it can be determined that the uplink signal from the user's wireless terminal is received. The minimum transmission time of the uplink signal is determined according to the wireless communication scheme which is supported by the wireless communication apparatus of FIG. 1. Adopting the condition that output of the high signal from the first comparator 163 and output of the low signal from the second comparator 164 continue for the minimum transmission time of the uplink signal or more avoids erroneous detection of an uplink signal, which may occur when a noise signal that indicates reception power similar to that of the uplink signal temporarily occurs.

When the wireless communication apparatus of FIG. 1 is a femtocell base station which is installed in, for example, a building, a signal transmitted from an outdoor wireless terminal generally incurs loss by passing through building materials, and thus the reception power of the signal tends to be smaller than the reception power of a signal transmitted from an indoor wireless terminal. Therefore, it is expected that most of uplink signals from wireless terminals (more specifically, outdoor wireless terminals) other than the user's wireless terminal indicate relatively small reception power. Therefore, only the first comparator 163 may be used, instead of using the first comparator 163 and the second comparator 164 together. Specifically, when the first comparator 163 outputs a low signal, it can be determined that the uplink signal from the user's wireless terminal is not received. On the other hand, when the first comparator 163 continues to output a high signal for the minimum transmission time of the uplink signal of the wireless terminal or more, it can be determined that the uplink signal from the user's wireless terminal is received.

In addition, generally, wireless terminals determine the initial transmission power of a random access signal based on a path loss in downlink. Then, the wireless terminals increases the transmission power step by step, as illustrated in FIG. 8, in consideration of uplink interference. FIG. 8 also illustrates the transmission power corresponding to the first threshold voltage (CMP Th1) and the transmission power corresponding to the second threshold voltage (CMP Th2). Each time a random access signal is transmitted, wireless terminals provide a transmission interval of 1 slot or more, to monitor (wait for) an acknowledgement (Ack) signal or a negative acknowledgement (Nack) signal (including disregard) for the random access signal. Also in view of such a general design idea of wireless terminals, setting the lower limit value of the reception power rather than the upper limit value thereof is considered to be effective for determining whether an uplink signal from the user's wireless terminal is received or not (as a matter of course, it is also possible to set both the lower limit value and the upper limit value of the reception power).

The following is explanation of power supply management processing performed by the power supply management module 130, with reference to FIG. 9. At the time when power supply management processing is started, the power supply for transmission/reception of wireless signals keeps off state. When the power supply management processing is started, the processing goes to Step S201. In step S201, the power supply management module 130 monitors an input signal from the trigger signal generator 160. Specifically, the power supply management module 130 monitors input signals from the first comparator 163 and the second comparator 164.

In step S202, the power supply management module 130 tries detecting a random access channel. Specifically, the power supply management module 130 determines whether a random access signal is received or not. For example, when the first comparator 163 outputs a low signal or the second comparator 164 outputs a high signal, the power supply management module 130 does not detect a random access channel. On the other hand, when the first comparator 163 continues to output a high signal and the second comparator 164 continues to output a low signal for the minimum transmission time of the uplink signal or more, the power supply management module 130 detects a random access channel. When the second comparator 164 is not used, only the conditions relating to the first comparator 163 are applied among the above determination criteria. In addition, although FIG. 9 shows the random access channel as object to be detected, the uplink channel (such as the dedicated channel) other than the random access channel may be used as object to be detected as a matter of course, as described above. When a random access channel is detected in step S202, the processing goes to Step S203. The processing returns to Step S201 when no random access channel is detected.

In step S203, the power supply management module 130 changes the power supply for transmission/reception of wireless signals from the off state to the on state. Next, the power supply management module 130 waits for handover of communication from a macrocell base station or the like to the wireless communication apparatus of FIG. 1 for a predetermined time (Step S204). Monitoring of handover may be performed by a processor (not shown) or the power supply management module 130. When handover occurs before the predetermined time has passed, the processing goes to Step S205. When no handover occurs at the time when the predetermined time has passed, the processing goes to Step S206. By waiting for handover only for the predetermined time, the power supply management module 130 can promptly return the power supply for transmission/reception of wireless signals to the off state when it is expected that erroneous detection of a random access channel occurs in step S202 (Step S206).

Regardless of presence or absence of handover, the threshold update module 170 can update the first threshold voltage and the second threshold voltage (comparator threshold) (Step S205 or Step S207). The threshold update module 170 may actually produce updated comparator thresholds, or supply a comparator threshold control signal to each comparator. In addition, the threshold update module 170 or another component (not shown) may update setting of the LNA switch at this or other timing. Various update algorithms may be applied, to update the comparator thresholds. For example, update of the comparator thresholds may be performed by increasing the first threshold voltage and/or decreasing the second threshold voltage (that is, tightening the uplink channel detection criteria) when no handover occurs (Step S207). As another example, update of the comparator thresholds may be performed by decreasing the first threshold voltage and/or increasing the second threshold voltage (that is, loosening the uplink channel detection criteria) when handover occurs (Step S205).

As described above, the wireless communication apparatus according to the first embodiment produces a voltage by using the reception power in the uplink channel. In addition, the wireless communication apparatus detects an uplink channel such as a random access channel, by confirming that the voltage continues to be a value which falls within a predetermined range for the minimum transmission time of the uplink signal or more. The wireless communication apparatus turns on the power supply for transmission/reception of wireless signals when it detects the uplink channel. Therefore, according to the wireless communication apparatus according to the present embodiment, it is possible to detect an uplink channel and activate itself, in a state where not only the power supply for transmission but also the power supply for reception of wireless signals are turned off. The hardware to produce a voltage by using the reception power in the uplink channel preferably has a configuration with small standby power, such as the trigger signal generator 160 illustrated in FIG. 4.

Second Embodiment

Figure 10:
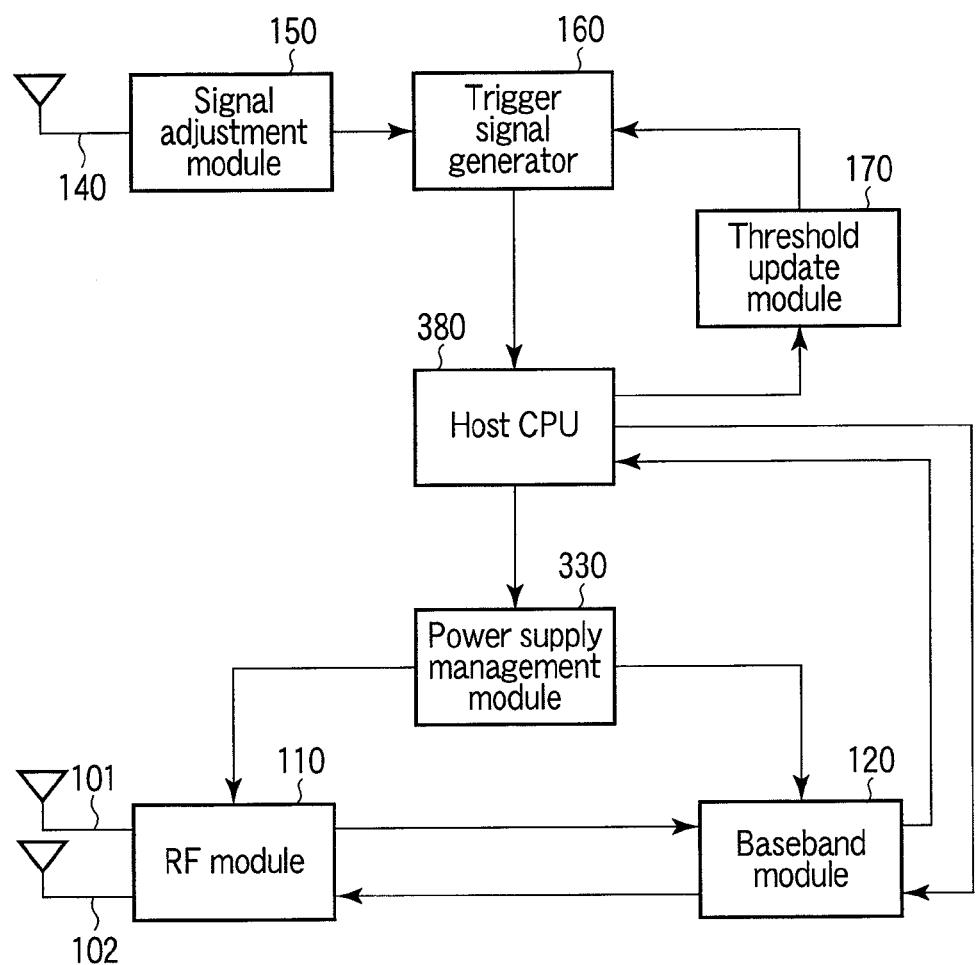
FIG. 10 is a block diagram illustrating a wireless communication apparatus according to the second embodiment.

In the above first embodiment, the power supply management module 130 of FIG. 1 performs the power supply management processing as illustrated in FIG. 9. On the other hand, in a second embodiment, a host CPU performs power supply management processing. As illustrated in FIG. 10, a wireless communication apparatus according to the present embodiment comprises antennas 101 and 102, an RF module 110, a baseband module 120, a power supply management module 330, an antenna 140, a signal adjustment module 150, a trigger signal generator 160, a threshold update module 170, and a host CPU 380. The wireless communication apparatus of FIG. 10 is, for example, a femtocell base station, but is not limited to it. The wireless communication apparatus of FIG. 10 may be realized by a mobile terminal or a PC. In the following explanation, components of FIG. 10 which are identical or similar to those of FIG. 1 are denoted by identical or similar respective reference numbers, and different portions are mainly described.

The host CPU 380 performs power supply management processing as illustrated in FIG. 9, in addition to general processing such as transmission/reception data processing. Specifically, the host CPU 380 achieves on/off control of the power supply by hardware interrupt through general-purpose input/output (GPIO) (for example, Steps S203 and S206). Although FIG. 10 shows the host CPU 380, the host CPU may be replaced by a processor of another type.

The power supply management module 330 manages the power supplies of the RF module 110 and the baseband module 120 in accordance with the hardware interrupt. Specifically, the power supply management module 330 can start/stop transmission/reception of wireless signals, by managing the on/off states of the power supply for transmission/reception of wireless signals in accordance with the hardware interrupt. While the power supply management module 330 keeps the power supply for transmission/reception of wireless signals off state, the power consumption by the RF module 110 and the baseband module 120 is ideally zero.

As described above, in the wireless communication apparatus according to the second embodiment, a processor such as the host CPU realizes power supply management processing similar to that of the first embodiment. Therefore, according to the wireless communication apparatus of the present embodiment, the same or similar effect as that of the first embodiment can be obtained.

(Modification)

In most of the above explanation, it is supposed that the wireless communication apparatus according to the embodiments is a femtocell base station. However, the same or similar effect can be obtained also in the case where the wireless communication apparatus according to the embodiments is a wireless local area network (LAN) access point.

For example, in a circumstance where both cellular communication and wireless LAN communication can be used, the user of a dual terminal may wish to use wireless LAN communication which achieves higher speed. In addition, wireless LAN access points are similar to femtocell base stations, in that the access points are typically installed in the user's house through a contract between the user and the communication provider, and limit wireless terminals for which connection is allowed (to, for example, wireless terminals of the contracted user). In consideration of such a form of use, it can be estimated that the time period in which wireless LAN access points are required to operate is limited, such as in the case of femtocell base stations.

To apply each of the above embodiments to a wireless LAN access point, it suffices to designate the power supply of a component for transmission/reception in wireless LAN communication (such as an RF module and a baseband module for a wireless LAN) as the object which is to be managed by the power supply management module 130 (or the host CPU 380 and the power supply management module 330). According to such a configuration, when the user's dual terminal transmits a random access signal (including an uplink signal such as a dedicated channel signal) to a macrocell base station or the like, the wireless LAN access point is activated and becomes usable by detection of the random access signal.

For example, a program which realizes the processing of each of the above embodiments can be provided in a storage medium which is readable by a computer. The storage medium may be any storage medium as long as it can store a program and is readable by a computer, such as a magnetic disk, an optical disc (CD-ROM, CD-R, DVD), a magneto-optical disc (such as MO), and a semiconductor memory.

In addition, a program which realizes the processing of each of the above embodiment may be stored in a computer (server) which is connected to a network such as the Internet, and downloaded to a computer (client) through the network.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus, comprising:
    a filter module configured to filter an uplink channel component from a received signal, wherein the received signal is received by an antenna;
    a generator configured to generate an input voltage based on the uplink channel component;
    a first comparator configured to output a first high signal when the input voltage is higher than a first threshold voltage and a first low signal when the input voltage is not higher than the first threshold voltage; and
    a power supply management controller configured to switch a power supply for transmission and reception of a wireless signal from an off state to an on state when the first high signal is output for at least a threshold period of time and to switch the power supply from the on state to the off state when handover of communication to the wireless communication apparatus does not occur within a predetermined period of time after the power supply is switched from the off state to the on state.

2. The apparatus of claim 1, further comprising an update module configured to increase the first threshold voltage when the handover of communication to the apparatus does not occur within the predetermined period of time after the power supply is switched from the off state to the on state.

3. The apparatus of claim 1, further comprising
    a second comparator configured to output a second high signal when the input voltage is higher than a second threshold voltage which is higher than the first threshold voltage and a second low signal when the input voltage is not higher than the second threshold voltage, and
    wherein the power supply management controller is further configured to switch the power supply from the off state to the on state when the first high signal and the second low signal are output for at least the threshold period of time.

4. The apparatus of claim 1, wherein the filter module comprises a plurality of surface acoustic wave (SAW) filters which have different passbands.

5. The apparatus of claim 1, wherein the filter module comprises a comb surface acoustic wave (SAW) filter which has a plurality of passbands.

6. A wireless communication apparatus, comprising:
    a filter module configured to filter an uplink channel component from a received signal, wherein the received signal is received by an antenna;
    a generator configured to generate an input voltage based on the uplink channel component;
    a comparator configured to output a high signal when the input voltage is higher than a threshold voltage and a low signal when the input voltage is not higher than the threshold voltage; and
    a processor configured to switch a power supply for transmission and reception of a wireless signal from an off state to an on state by performing a hardware interrupt through general-purpose input/output (GPIO) when the high signal is output for at least a threshold period of time and to switch the power supply from the on state to the off state when handover of communication to the wireless communication apparatus does not occur within a predetermined period of time after the power supply is switched from the off state to the on state.

* * * * *